(12) United States Patent
Badireddy et al.

(10) Patent No.: US 11,878,276 B2
(45) Date of Patent: *Jan. 23, 2024

(54) NANOBIOCATALYST AND NANOBIOCATALYTIC MEMBRANE

(71) Applicant: University of Vermont and State Agricultural College, Burlington, VT (US)

(72) Inventors: Appala Raju Badireddy, Burlington, VT (US); Huijie Lu, Zhejiang Sheng (CN)

(73) Assignee: University of Vermont and State Agricultural College, Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/590,890

(22) Filed: Feb. 2, 2022

(65) Prior Publication Data
US 2022/0152560 A1 May 19, 2022

Related U.S. Application Data

(63) Continuation of application No. 16/484,584, filed as application No. PCT/US2018/015880 on Jan. 30, 2018, now Pat. No. 11,266,955.

(Continued)

(51) Int. Cl.
*B01D 69/14* (2006.01)
*B01D 65/08* (2006.01)
(Continued)

(52) U.S. Cl.
CPC ....... *B01D 69/145* (2013.01); *B01D 46/0001* (2013.01); *B01D 46/0027* (2013.01);
(Continued)

(58) Field of Classification Search
CPC ...... B01D 69/02; B01D 69/12; B01D 69/142; B01D 69/144; B01D 69/145;
(Continued)

(56) References Cited

U.S. PATENT DOCUMENTS 11,266,955 B2 * 3/2022 Badireddy ............. C02F 1/444
2012/0318731 A1 12/2012 Elbahri et al.
(Continued)

FOREIGN PATENT DOCUMENTS

WO 2015/084279 A1 6/2015

OTHER PUBLICATIONS

Ambashta et al., "Water purification using magnetic assistance: A review." Journal of Hazardous Materials, 180 (2010) 38-49.
(Continued)

*Primary Examiner* — John Kim
(74) *Attorney, Agent, or Firm* — Pierce Atwood LLP (57) ABSTRACT

A nanobiocatalytic membrane for a filtration system is provided which includes a filtration membrane and a plurality of nanobiocatalyst nanoparticles associated with the membrane, each of the nanobiocatalyst nanoparticles including a core, a coating at least partially surrounding the core, and a plurality of nanobiocatalysts coupled to the coating. Each of the plurality of nanobiocatalysts includes an antibacterial nanoparticle comprising bismuth, and a quorum quenching agent coupled to the antibacterial nanoparticle. A nanobiocatalyst nanoparticle for use with a water purification system is also provided. A method of forming a nanobiocatalytic membrane for a filtration system and a method of using a nanobiocatalytic membrane in a filtration system are also provided.

15 Claims, 11 Drawing Sheets

Related U.S. Application Data (60) Provisional application No. 62/457,212, filed on Feb. 10, 2017.

(51) Int. Cl.
| | |
|---|---|
| *B01D 67/00* | (2006.01) |
| *B01D 69/02* | (2006.01) |
| *B01D 69/12* | (2006.01) |
| *B01D 71/02* | (2006.01) |
| *B01D 71/34* | (2006.01) |
| *C02F 1/44* | (2023.01) |
| *C02F 1/50* | (2023.01) |
| *B01D 61/02* | (2006.01) |
| *B01D 61/14* | (2006.01) |
| *B01D 46/00* | (2022.01) |
| *B01D 61/58* | (2006.01) |

(52) U.S. Cl.
CPC ..... *B01D 46/0028* (2013.01); *B01D 46/0034* (2013.01); *B01D 61/025* (2013.01); *B01D 61/145* (2013.01); *B01D 65/08* (2013.01); *B01D 67/0079* (2013.01); *B01D 67/0088* (2013.01); *B01D 69/02* (2013.01); *B01D 69/12* (2013.01); *B01D 69/142* (2013.01); *B01D 69/144* (2013.01); *B01D 69/148* (2013.01); *B01D 71/027* (2013.01); *B01D 71/34* (2013.01); *C02F 1/444* (2013.01); *C02F 1/50* (2013.01); *B01D 61/026* (2022.08); *B01D 61/027* (2013.01); *B01D 61/146* (2022.08); *B01D 61/147* (2013.01); *B01D 61/58* (2013.01); *B01D 2311/2692* (2013.01); *B01D 2311/2696* (2013.01); *B01D 2315/10* (2013.01); *B01D 2319/025* (2013.01); *B01D 2321/166* (2013.01); *B01D 2325/10* (2013.01); *B01D 2325/46* (2013.01); *B01D 2325/48* (2013.01); *C02F 1/441* (2013.01); *C02F 1/442* (2013.01); *C02F 2303/20* (2013.01); *C02F 2305/08* (2013.01)

(58) Field of Classification Search
CPC .............. B01D 69/148; B01D 46/0001; B01D 46/0027; B01D 46/0028; B01D 46/0034; B01D 65/08; B01D 67/0079; B01D 67/0088; B01D 71/024; B01D 71/027; B01D 71/34; B01D 61/02; B01D 61/022; B01D 61/025; B01D 61/026; B01D 61/027; B01D 61/142; B01D 61/146; B01D 61/147; B01D 61/58; B01D 2311/2692; B01D 2311/2696; B01D 2315/10; B01D 2319/025; B01D 2321/166; B01D 2325/10; B01D 2325/46; B01D 2325/48; C02F 1/44; C02F 1/441; C02F 1/442; C02F 1/444; C02F 1/50; C02F 2303/20; C02F 2305/08; C02F 3/342

See application file for complete search history.

(56) References Cited

U.S. PATENT DOCUMENTS

| | | |
|---|---|---|
| 2014/0193889 A1 | 7/2014 | McDaniel |
| 2014/0299537 A1 | 10/2014 | Kim et al. |
| 2014/0367326 A1 | 12/2014 | Deng et al. |
| 2015/0099095 A1 | 4/2015 | Pershin et al. |

OTHER PUBLICATIONS

Badireddy et al., "Antibacterial and Antifouling Properties of Lipophillic Bismith Compounds." Advances in Chemistry Research, vol. 21, Chapter 1, (2014).

Badireddy et al., "Synthesis and characterization of lipophilic bismuth dimercaptopropanol nanoparticles and their effects on oral microorganisms growth and biofilm formation." J Nanopart Res (2014) 16:2456.

Chen et al., "Quorum Quenching Enzymes and Their Application in Degrading Signal Molecules to Block Quorum Sensing-Dependent Infection." Int. J. Mol. Sci. 2013, 14, 17477-17500; dol:10.3390/ijms140917477.

Datta et al., "Enzyme immobilization: an overview on techniques and support materials." 3 Biotech (2013) 3:1-9.

Gebreyohanes et al., "Pectinases Immobilization on magnetic nanoparticles and their anti-fowling performance in a biocatalytic membrane reactor." RSC Adv., 2016, 6, 98737-98747.

Herzberg et al., "Biofouling of reverse osmosis membranes: Role of biofilm-enhanced osmotic pressure." Journal of Membrane Science 295 (2007) 11-20.

Jiang et al., "Effect of quorum quenching on the reactor performance, blofouling and biomass characteristics in membrane bioreactors." Water research, vol. 47, Issue 1, Jan. 1, 2013, pp. 187-196.

Kim et al., "Enzyme-Immobilized Nanofiltration Membrane to Mitigate Biofouling Based on Quorum Quenching." Environ. Sci. Technol. 2011, 45, 1601-1607 Jan. 2011.

Leitgeb et al., "Micro- and Nanocarriers for Immobilization of Enzymes." Micro and Nantechnologies for Biotechnology, Chapter 2, (2016).

Naito et al., "Smart Powder Processing for Advanced Materials." KONA Powder and Particle Jounal, vol. 27, pp. 130-143, (2009).

Oh et al., "Control of Membrane Biofouling in MBR for Wastewater Treatment by Quorum Quenching Bacteria Encapsulated in Microporous Membrane." Environ. Sci. Technol. 2012, 46, 4877-4884.

Search Report and Written Opinion of the International Searching Authority dated Mar. 30, 2018, from correspnding international application PCT/US2018/015880 filed on Jan. 30, 2018.

Zhang et al., "Mesoporous Silica-Coated Gold Nanorods as a Light-Mediated Multifunctional Theranostic Platform for Cancer Treatment." Adv. Mater. 2012, 24, 1418-1423.

\* cited by examiner

| Natural compound(s) | Source |
|---|---|
| Furanone/ 2(5H)-Furanone/ | Macroalga (Delisea pulchra) |
| (5Z)-4-bromo-5-(bromomethylene)-3-butyl-2(5H)-furanone | Macroalga (Delisea pulchra) |
| Ajoene (1-Allyldisulfanyl-3-(prop-2-ene-1-sulfinyl)-propene) | Garlic extract (Allisum sativum) |
| Iberin (1-Isothiocyanato-3-(methylsulfinyl)propane) | Horseradish extract (Armoracia ruticana) |
| Sulforaphane (1-Isothiocyanato-4d-(methylsulfinyl)butane) | Boroccoli |
| Erucin (4-methylthiobutyl isothiocyanate) | Boroccoli |
| Naringin (4'5-diOH-Flavone-7-rghluc) | Citrus extract |
| Naringenin (4'5,7,Trihydroxyflavanone) | Malagasy bark extract (combretum albiflorum) |
| Taxifolin/Distylin (dihydroquercetin) | Malagasy plant extract (Combretum albiflorum) |
| Morin (2',3,4',5,7-Pentahydroxyflavone) | Grapefruit (Artocarpus heterophyllus) |
| Patulin/Clavacin (4-Hydroxy-4H-furo[3,2-c]pyran-2(6H)-one) | Penicillum sp. |
| Penicillic acid (3-Methoxy-5-methyl-4-oxo-2,5-hexadienoic acid) | Penicillum sp. |
| Vanillin (4-Hydroxy-3-methoxybenzaldehyde) | Vanilla bean extract (Vanilla planifolia Andrews) |
| Agrocinopine B ( [3S,4R,5R)-3,4,5,6-tetrahydroxy-2-oxohexyl] [(2R,3S,4S)-3,4,5-trihydroxy-1-oxopentan-2-yl] hydrogen phosphate) | Crown gall cells |
| L-canavanine (L-$\alpha$-Amino-$\gamma$-(guanidinoxy)-n-butyric acid) | Seed exudates (Medicao sativa) |
| Gamma-aminobutyric acid (GABA) (4-Aminobutanoic acid) | Plants (Arabidopsis sp) |
| Rosmarinic acid (R-O-(3,4-Dihydroxycinnamoyl)-3-(3,4-dihydroxyohenyl) lactic acid) | Sweet basil (Ocimum Basilcum) |
| Salycilic acid (2-Methyl-5-tert-butylsalicylic acid) | Plant phenolic secondary metabolite |

FIG. 6A

| Natural compund(s) | Source |
|---|---|
| Chlorogenic acid (3-Caffeoylquinic acid) | Plant extract (Moringa oleifera) |
| Allin (2-Amino-3-[prop-2-ene-1-sulfinyl]-propionic acid) | Garlic extract (Allisum sativum) |
| Ursolic acid(3beta-Hydroxyurs-12-en-28-oic acid) | Plant extract (Sambucus chinesis) |
| Eflagic acid (Benzoaric acid) | Fruit extract of Terminalia chebula Retz. |
| α—Hydroxybutyric acid (2-hydroxy-butanpoic acid) | Aribidopsis exudates |
| Epigallocatechin gallate (Epigallocatechol) | Green tea (Camellia sinensis L.) |
| Pyrogallo (1,2,3-Trihydroxybenzene) | Plant extract (Punica granatum) |
| Cinnamon oil/Cynnamaldheyde (trans-Cinnamaldehyde) | Cinnamomum zeylanicum |
| Furocoumarin/Psoralen (7H-Puro[3,2-g][1]benzopyran-7-one) | Grapefruit juice and extract (Psoralea corylifolia L.) |
| Urolithm (3,8-Dihydroxy-benzo(c)chromen-6-one) | Ellagitannin-rich extract from Pomegranate |

FIG. 6B

| Binding Methods | Supports |
| --- | --- |
| Electrostatic Interaction | Carboxl-functioned magnetic NPS<br>magnetic NPs - chitosan |
| Physical Adsorption | Zinc oxide NPs<br>PAN NFs |
| Chemical Modification | Silica NPs |
| Amino Functionalization | Silica NPs |
| Thiol Linkages | Silver NPS |
| Alkyl Grafting | Ferric silica NCs |
| Bioaffinity | Concanavalin A - Magnetic NPs |
| Imidoesterification | PAN NFs |
| Hydrophobic Interaction | CNTs |
| Covalent by Glutaraldhyde | Polyaniline - Magnetic NPs<br>polysiloxane/polyvinyl alcohol - Magnetic NPs<br>Graphite NSs |

FIG. 9B
Coated PVDF (BisBAL + Enzyme Treatment)

FIG. 9A
Control PVDF (No Treatment)

NANOBIOCATALYST AND NANOBIOCATALYTIC MEMBRANE

This application is a continuation under 35 U.S.C. § 120 of U.S. patent application Ser. No. 16/484,584 filed on Aug. 8, 2019, U.S. Pat. No. 11,266,955; and claims priority under 35 U.S.C. § 371 to International Application No. PCT/US2018/015880 filed on Jan. 30, 2018, which claims the benefit under 35 U.S.C. § 119(e) to U.S. Provisional Application No. 62/457,212 filed on Feb. 10, 2017 the contents of each of which is incorporated by reference herein in its entirety.

FIELD OF THE INVENTION

This disclosure relates generally to a nanobiocatalyst and a nanobiocatalytic membrane for use in a filtration system such as a water treatment system.

BACKGROUND

In a filtration system, such as a water treatment system, one or more membranes may be used to filter out various sized impurities. As particles collect on the membrane, a biofilm may also develop on the membrane. The formation of a biofilm on the membrane is generally known to be undesirable and may lead to membrane biofouling. Biofouling may cause a decrease in filtration flow, reducing the treatment capacity of the filter. Known approaches to removing biofilms typically involve shutting down the water treatment system and washing the membrane using physical and/or chemical cleaning agents to remove foulants from the membrane surface. The membrane may be cleaned by backwashing, sonication or heat treatment, or it may be chemically cleaned by alkalis, acids, metal chelating agents and/or surfactants.

SUMMARY

In one embodiment, a nanobiocatalytic membrane for a filtration system is provided. The nanobiocatalytic membrane includes a filtration membrane and a plurality of nanobiocatalyst nanoparticles associated with the membrane, each of the nanobiocatalyst nanoparticles including a core, a coating at least partially surrounding the core, and a plurality of nanobiocatalysts coupled to the coating. Each of the plurality of nanobiocatalysts includes an antibacterial nanoparticle comprising bismuth, and a quorum quenching agent coupled to the antibacterial nanoparticle.

In another embodiment, a nanobiocatalyst nanoparticle for use with a water purification system is provided. The nanobiocatalyst includes a core, an outer layer substantially surrounding the core, a plurality of antibacterial nanoparticles coupled to the outer layer, the antibacterial nanoparticles including bismuth, and a plurality of quorum quenching enzymes immobilized on at least one of the plurality of antibacterial nanoparticles.

In yet another embodiment, a method of forming a nanobiocatalytic membrane for a filtration system is provided. The method includes providing a core, precipitating silica on the surface of the core to form a coated nanoparticle including a mesoporous silica outer layer, and forming antibacterial nanoparticles and attaching the antibacterial nanoparticles to the coated nanoparticle via the silica in the mesoporous silica outer layer. The method further includes immobilizing quorum quenching enzymes on the antibacterial nanoparticles with a binding agent, and providing a membrane and associating the coated nanoparticle with the membrane.

In yet another embodiment, a method of using a nanobiocatalytic membrane in a filtration system is provided. The method includes providing a nanobiocatalytic membrane in a fluid passageway, wherein the nanobiocatalytic membrane includes at least one nanobiocatalyst nanoparticle coupled to a membrane, wherein the at least one nanobiocatalyst nanoparticle includes a core, a coating, a plurality of bismuth nanoparticles, and a plurality of quorum quenching enzymes. The method further includes flowing a fluid through the passageway and across the nanobiocatalytic membrane, solubilizing bismuth from the bismuth nanoparticles, and interfering with intercellular communication to reduce the production of biofilms.

BRIEF DESCRIPTION OF THE DRAWINGS

FIGS. 6A and 6B illustrate a list of natural compounds which include quorum quenching enzymes.

DETAILED DESCRIPTION

Biofouling on the membrane in a filtration system, such as a water treatment system, is generally undesirable, but the current techniques for removing biofilms from these membranes suffer from several problems. First, the chemical cleaning agents which may be used to destroy or remove the biofilm may contain non-green reagents, and these cleaning agents may potentially add harmful chemicals to the downstream water. Second, physically washing the membranes to remove the biofilm involves both significant personnel time and down time for the water treatment system. Third, these methods have limited effectiveness due to incomplete removal of the biomass, detrimental effects to the membrane materials, and/or rapid regrowth of the biofilm after cleaning.

Accordingly, as set forth in greater detail below, a filter membrane and membrane treatment are described where the membrane is configured to reduce the formation of a bio film on the membrane. In particular, it has been found that incorporating nanobiocatalysts and antimicrobial agents onto the membrane helps to prevent the growth of a biofilm on the membrane. By reducing the formation of a biofilm on the membrane, less chemical cleaning is needed, less personnel time is needed to clean the membrane, and/or less down time is required for the filtration system.

One aspect of the disclosure is directed to the use of a plurality of antibacterial nanoparticles that include one or more nanobiocatalysts. As set forth in greater detail below, the antibacterial nanoparticles may help to suppress EPS production by bacteria at sub-MIC bismuth concentrations, kill bacteria above MIC, or prevent intercellular communication between bacteria. Accordingly, when these antibacterial nanoparticles are coupled to the membrane, they help to prevent the formation of a biofilm on the membrane. In one particular embodiment, antibacterial bismuth nanoparticles may be employed. As discussed in greater detail below, in another embodiment, other antibacterial nanoparticles are also contemplated, as the invention is not limited in this respect.

Another aspect of the present invention is directed to the use of a nanobiocatalyst that contains a plurality of quorum quenching agents. A quorum quenching agent is a substance that can disrupt intercellular communication between bacteria. Quorum quenching agents include, for example, quorum quenching enzymes. Quorum quenching enzymes are capable of quenching the microbial quorum sensing signaling and shutting down the expression of a pathogenic gene which may block pathogenic infections. Accordingly, when these quorum quenching enzymes are coupled to the membrane, they may inhibit communication between bacteria on the membrane, thereby preventing the growth of bacterial colonies and subsequent biofilms. In one particular embodiment, the quorum quenching enzymes may include either acylase and/or lactonase. As discussed in greater detail below, in another embodiment, other compounds including quorum quenching enzymes are also contemplated, as the invention is not limited in this respect.

As set forth in more detail below, various aspects are directed to a two pronged attack that utilizes a nanobiocatalyst that includes both the antibacterial nanoparticles and the quorum quenching enzymes. The antibacterial nanoparticles and quorum quenching enzymes can be positioned on the surface of the membrane to both kill bacteria upon contact and also inhibit communication between bacteria. As discussed below, these nanobiocatalysts may be associated with and immobilized on the membrane through chemical bonding including ionic and/or covalent bonding. As discussed below, existing membranes can be modified to include this unique nanobiocatalyst coating and/or the membrane may be manufactured to include the nanobiocatalyst. Furthermore, the end user may not have to significantly change their current operating procedures or perform any significant retrofitting to incorporate the unique nanobiocatalytic membrane.

Another aspect is directed to the use of a magnetic core to carry the nanobiocatalysts. In particular, a plurality of nanobiocatalysts may be coupled to a magnetic core either directly or via a coating. The nanobiocatalysts may be sized and configured so that over time, they may no longer be retained on the membrane and may pass through the membrane. When the nanobiocatalysts are coupled to a magnetic core, they can be magnetically recovered downstream of the membrane. As set forth in more detail below, the recovered magnetic core can then be reloaded with nanobiocatalyst and/or quenching enzymes and may be returned to the membrane and used again to prevent the formation of a biofilm on the membrane. Recapturing the magnetic core and associated nanobiocatalysts may be advantageous because it may minimize the concentration of nanobiocatalysts in the fluid downstream of the membrane. Recapturing the nanobiocatalysts may also be advantageous to help keep costs associated with the nanobiocatalysts down, since they can be recycled.

It should be appreciated that the nanobiocatalysts and nanobiocatalytie membranes may be employed in various types of filtration systems, as the present invention is not limited in this respect. Some of the embodiments discussed below are directed to water filtration systems. One of ordinary skill in the art will appreciate that the nanoparticles may be employed in a variety of types of fluid filtration systems, such as, but not limited to aqueous systems including waste water filtration systems, drinking water filtration systems, desalination plants, and filtration systems in manufacturing facilities in food and beverage industry and/or in biomedical industry. The nanoparticles and membranes described herein may also be useful in non-aqueous applications including filter systems for natural and synthetic petroleum products including hydraulic fluids, heat transfer fluids and coolants.

Figure 1:
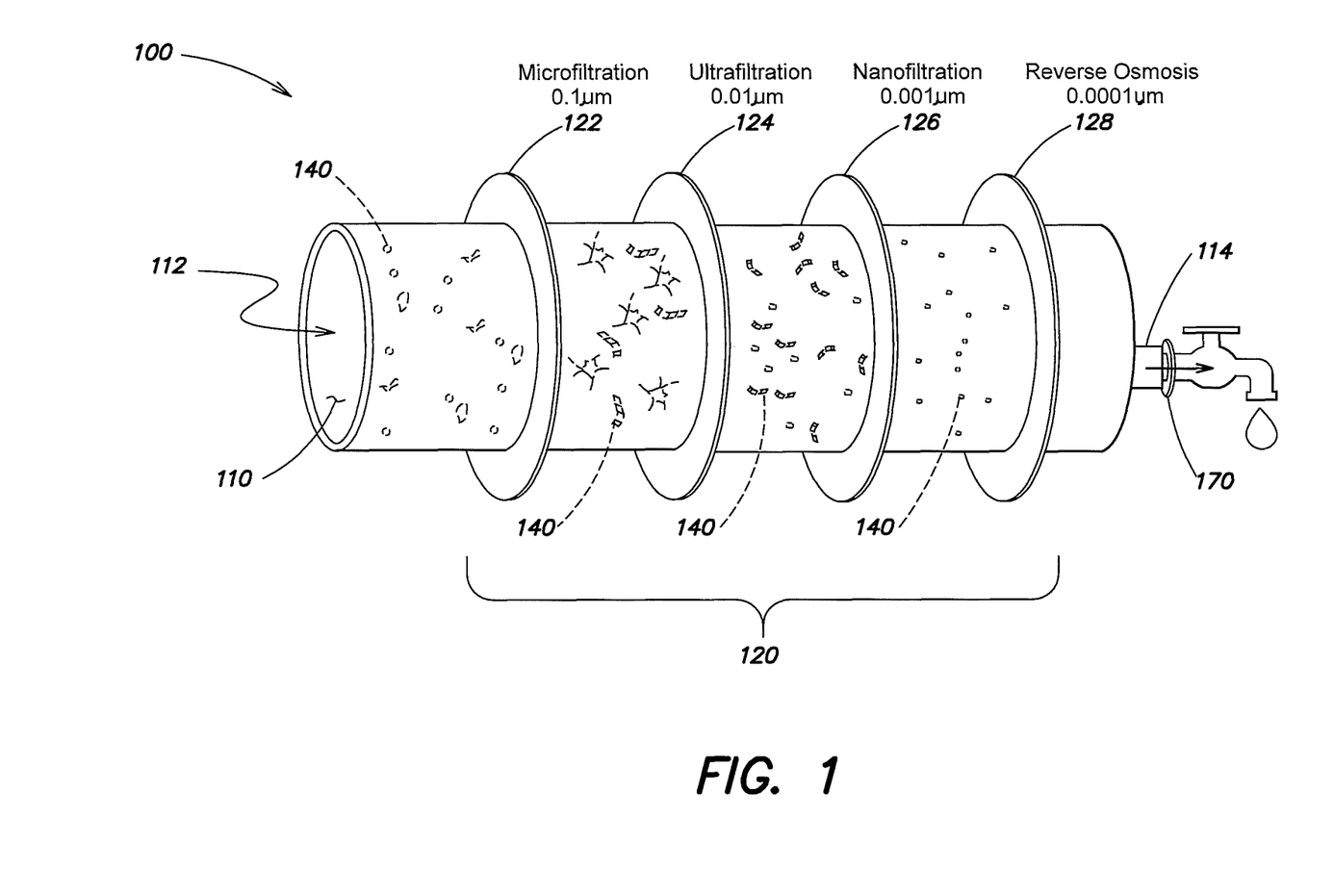
FIG. 1 is a schematic view of one embodiment of a nanobiocatalytic membrane in a dead end filtration system.

Turning now to FIG. 1, a schematic view of one embodiment of a nanobiocatalytic membrane in a dead end filtration system 100 is illustrated. In a dead end fluid filtration system, all of the fluid passes through at least one membrane 120. As shown, the fluid filtration system 100 includes a passageway 110 having an inlet 112 and an outlet 114. A fluid, such as water, mixed with particles 140 enters the passageway 110 through the inlet 112. As shown, the various particles 140 get filtered out of the water at the membranes 122-128 and the filtered water exits the passageway 110 through the outlet 114.

In this illustrative schematic, the water filtration system 100 includes a plurality of membranes 120 through which the water in the passageway 110 must flow. The particular embodiment shown in FIG. 1 includes a plurality of membranes 120 ranging from a microfiltration membrane 122, an ultrafiltration membrane 124, a nanofiltration membrane 126, and a reverse osmosis membrane 128, each designed to filter out particles above a certain particle size. In a typical embodiment, the microfiltration membrane is configured to filter out particles that are larger than 0.1 μm, the ultrafiltration membrane is configured to filter out particles that are larger than 0.01 μm, the nanofiltration membrane is configured to filter out particles that are larger than 0.001 μm, and the reverse osmosis membrane is configured to filter out dissolved substances and particles that are larger than 0.0001 μm. The particles 140 in the passageway 110 that cannot pass through each membrane 122, 124, 126, and 128 may collect on the membrane, and microbes in the stream may begin to form the above-mentioned biofilm on the membrane surface. It should be appreciated that in other embodiments, the membrane(s) 120 may be configured differently as the invention is not so limited. Different embodiments may use one, two, three or more different membranes. More details about the various types of membranes 120 that may be employed are discussed in greater depth below.

Figure 2:
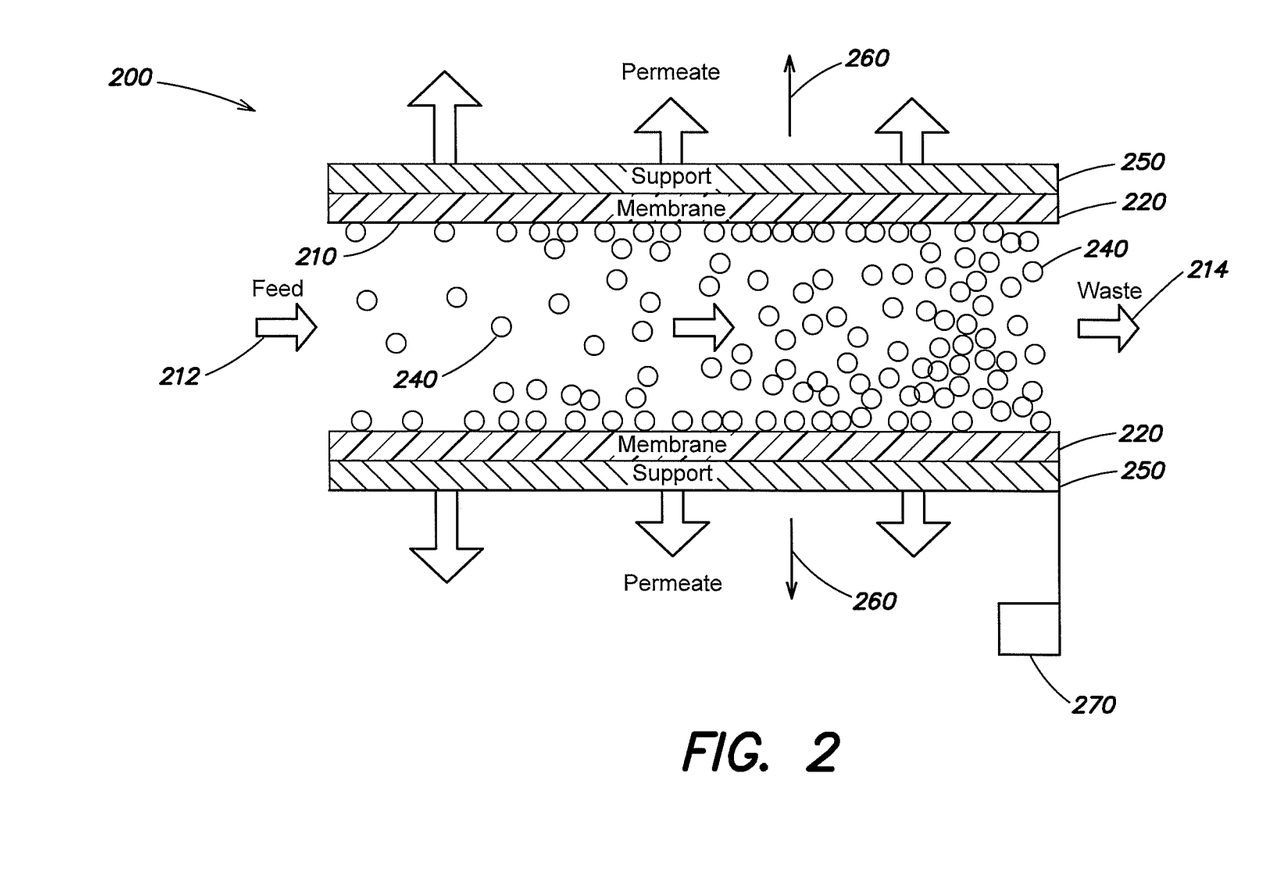
FIG. 2 is a schematic view of another embodiment of a nanobiocatalytic membrane in a cross flow filtration system.

FIG. 2 illustrates a schematic view of another embodiment of a nanobiocatalytic membrane in a cross flow fluid filtration system 200. In a cross flow fluid filtration system (also known as a tangential flow filtration), the fluid, such as water, flows tangentially across the surface of the membrane, rather than through the membrane. As shown, the fluid filtration system 200 includes a passageway 210 having an inlet 212 and a waste outlet 214. Water and particles 240 enter the passageway 210 through the inlet 212 under pressure and, as shown, water passes tangentially through pores in the membrane 220 while the excluded particles 240 exit through the waste outlet 214. The discharged fluid may be disposed of or may be recycled through the system. The filtered water permeates through one or more membranes 220 and exits through the water outlet 260 which may be coaxially formed about the perimeter of the passageway 210 and membrane 220. In one particular embodiment, the fluid filtration system 200 also includes a support 250 to position and hold the membrane 220. As with the dead end systems described above, microbes may collect on the membrane 220 and begin to form the above-mentioned biofilm.

Figures 3A, 3B, 3C, 3D:
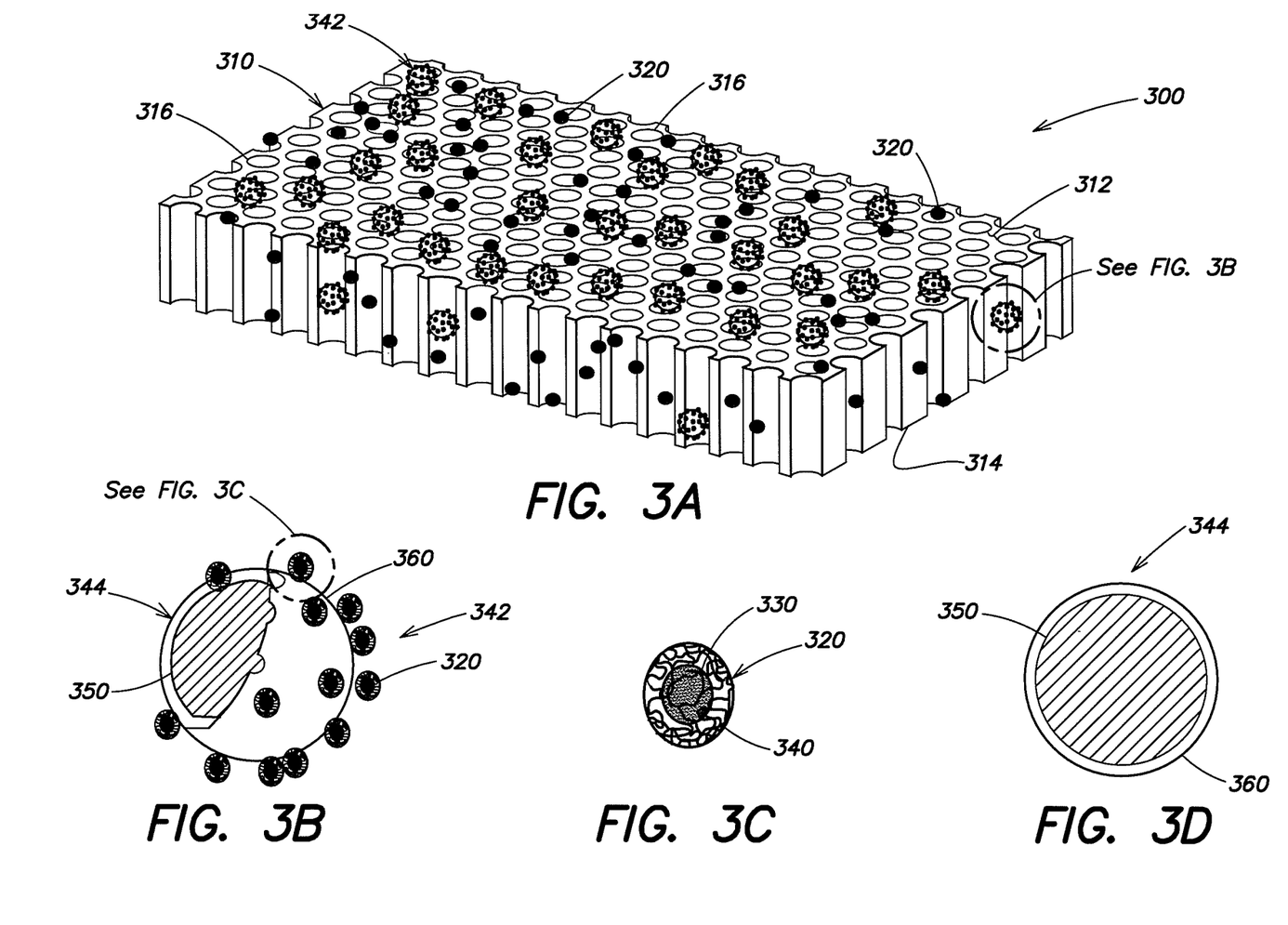
FIG. 3A is a detailed perspective view of a nanobiocatalytic membrane according to one embodiment.
FIG. 3B is a detailed view of a magnetic nanobiocatalyst shown in FIG. 3.
FIG. 3C is a detailed view of a nanobiocatalyst shown in FIG. 3B.
FIG. 3D is a cross-sectional view of a nanoparticle shown in FIG. 3B.

FIG. 3A illustrates a detailed perspective view of a nanobiocatalytic membrane 300, according to one embodiment, which is configured to reduce the formation of the biofilms on the membrane. In this illustrative embodiment, there is a plurality of nanobiocatalysts 320 coupled to a porous membrane 310 via a silica coated nanoparticle 342. The nanobiocatalysts 320 are shown in greater detail in FIGS. 3B-3C. As shown, each nanobiocatalyst 320 includes an antibacterial nanoparticle 330 and a quorum quenching agent 340.

Antibacterial nanoparticle 330 can include a material that is toxic to bacteria. The material may be partially soluble in water so that it is provided to the system at a consistent rate. The material may be lipophilic to facilitate contact with bacteria in the water. In this particular embodiment, the antibacterial nanoparticle 330 is comprised of antimicrobial lipophilic bismuth dimcrcaptopropanol (BisBAL NP), however other antibacterial nanoparticles may be used. In this particular illustrative embodiment, the quorum quenching agent 340 is acylase, however other quorum quenching enzymes can be used, some of which are discussed below. The method of forming the nanobiocatalysts 320 is discussed in more detail below, but as shown in the embodiment illustrated in FIG. 3C, the quorum quenching agent 340 may be immobilized on the antibacterial nanoparticle 330 such that it substantially surrounds but does not encapsulate the antibacterial nanoparticle.

As shown in FIG. 3B, the nanobiocatalysts 320 can be coupled to a nanoparticle 344. As shown in more detail in FIG. 3D, the nanoparticle 344 can include a core 350 and an outer layer 360. Outer layer 360 may comprise a same or different material as core 350. For example, the core may comprise a ferromagnetic material while the outer layer comprises a metal oxide. In some embodiments, core 350 may comprise iron in the form of iron oxide, $Fe_3O_4$. When associated with nanoparticle 344 as shown in FIG. 3B, the nanobiocatalysts 320 form nanobiocatalyst nanoparticle 342. When core 350 is magnetic, a magnetic nanobiocatalyst nanoparticle 342 is formed. In one set of embodiments, the outer layer 360 can couple the nanobiocatalysts 320 to the core 350. Outer layer 360 can be porous and in the embodiment shown is a mesoporous material. As used herein, mesopores have a pore diameter between approximately 2-50 nm. As discussed in more detail below, the mesoporous outer layer 360 can couple the nanobiocatalysts 320 (antibacterial nanoparticles 330 and the quorum quenching enzymes 340) to core 350 through chemical bonding such as ionic, covalent or vanDerWaals forces. In one illustrative embodiment, the core 350 is formed of magnetite ($FeO_4$) and the mesoporous outer layer 360 is made of mesoporous silica ($SiO_2$), but other materials are also contemplated and are discussed below. In one embodiment, a mesoporous outer layer may be desirable for offering a higher surface area for functionalization of BisBal and enzyme to the silica surface.

As shown in FIG. 3A, membrane 310 has a first membrane surface 312 and a second membrane surface 314 opposite the first membrane surface 312. The membrane 310 can comprise a material that is free of antimicrobial materials, and the bioactive nanoparticles 342 may be positioned only on the exposed surfaces of the membrane and not embedded in the membrane material. Nanobiocatalyst nanoparticle 342 is sized and configured to move through the membrane 310, from the first membrane surface 312 through to the second membrane surface 314. For example, nanoparticle 342 can have a diameter that is less than the pore size of a micro or ultra-filtration membrane to help, for example, in preventing clogging of the pores. As shown, nanoparticles 342 can be positioned on the first membrane surface 312 (shown as the upper surface in FIG. 3A) or on the walls of the pores themselves. In the embodiment shown in FIG. 3A, the membrane 310 is a porous membrane with a plurality of pores 316 extending therethrough from the first membrane surface 312 to the second membrane surface 314. As shown, some of the magnetic nanobiocatalyst nanoparticles 342 are positioned within the pores 316 of the membrane 310. The figure also illustrates that individual nanobiocatalysts 320 can be associated with the membrane directly, without first being attached to nanoparticle 344.

The process in which the nanoparticles 342 may be physically or chemically bonded to the membrane is discussed more below, but initially, the nanobiocatalyst nanoparticles 342 may be coupled to the first membrane surface 312, may be coupled inside of the pores 316 of the membrane 310 and/or may be coupled to the second membrane surface 314. In one embodiment, the magnetic nanobiocatalyst nanoparticles 342 form a coating on one or both of the membrane surfaces 312, 314 and the coating may extend into the membrane pores 316. Such a coating of the nanobiocatalysts nanoparticles may be advantageous over a configuration where antibacterial agents are embedded into the membrane because agents that are embedded within the membrane lack exposure to the microbes and may be ineffective at contributing to the prevention of the formation of a biofilm. For example, the particle coated membranes described herein may be 10× or 100× more effective, wt/wt, than membranes that include antibacterial agents within the membrane material itself.

As fluid passes over the membrane 310 and Bi particles and enzymes are depleted, the bond coupling the nanobiocatalyst nanoparticles 342 to the membrane may weaken causing the nanoparticles to become dislodged from the membrane 310 and flow downstream with the permeate. Accordingly filtration system 100, 200 may include a magnetic trap 170, 270 positioned downstream of the membranes 120, 220 which is configured to recover one or more of the magnetic cored nanoparticles 342 after they pass through the membrane 120, 220. Representative magnetic devices 170, 270 are schematically illustrated in FIGS. 1 and 2. One of ordinary skill in the art will appreciate that the magnetic device 170, 270 may be configured such that it magnetically attracts the magnetic core 350. Thus, after the nanoparticles 342 (and any associated nanobiocatalysts 320 coupled thereto) pass through the membrane 310, they are magnetically drawn to and collected with the magnetic device 170, 270. These recovered magnetic nanoparticles 342 may be periodically retrieved from the filtration system and may be regrown and reloaded back onto the membrane for further use.

As shown in the embodiments illustrated in FIGS. 1 and 2, the magnetic device 170, 270 is positioned within the passageway 110, 210. It should also be appreciated that in another embodiment, the magnetic device 170, 270 may be positioned outside of the passageways 110, 210 such that the magnetic attraction between the magnetic cores 350 and the magnetic devices 170, 270 still remain such that the magnetic cores 350 and its associated nanobiocatalysts can still be collected and retrieved downstream of the membranes.

Figure 4A:
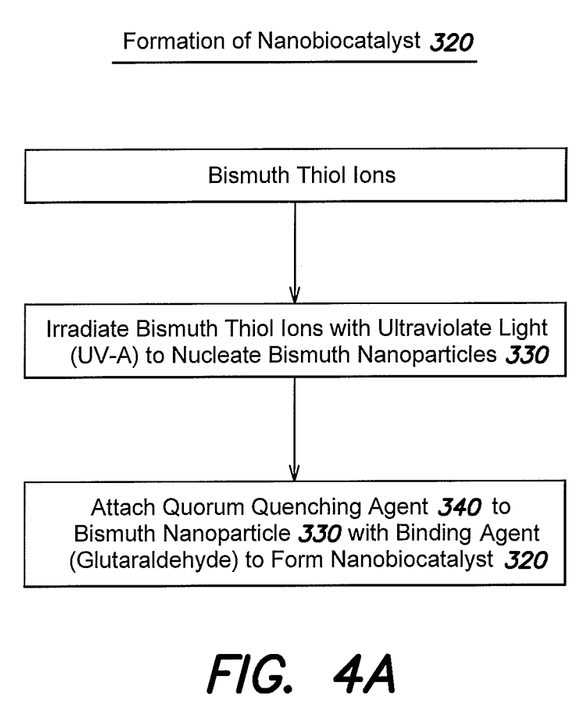
FIGS. 4A and 4B are block diagrams outlining the steps associated with manufacturing the nanobiocatalyst and the nanobiocatalytic membrane according to one embodiment.
Figure 4B:
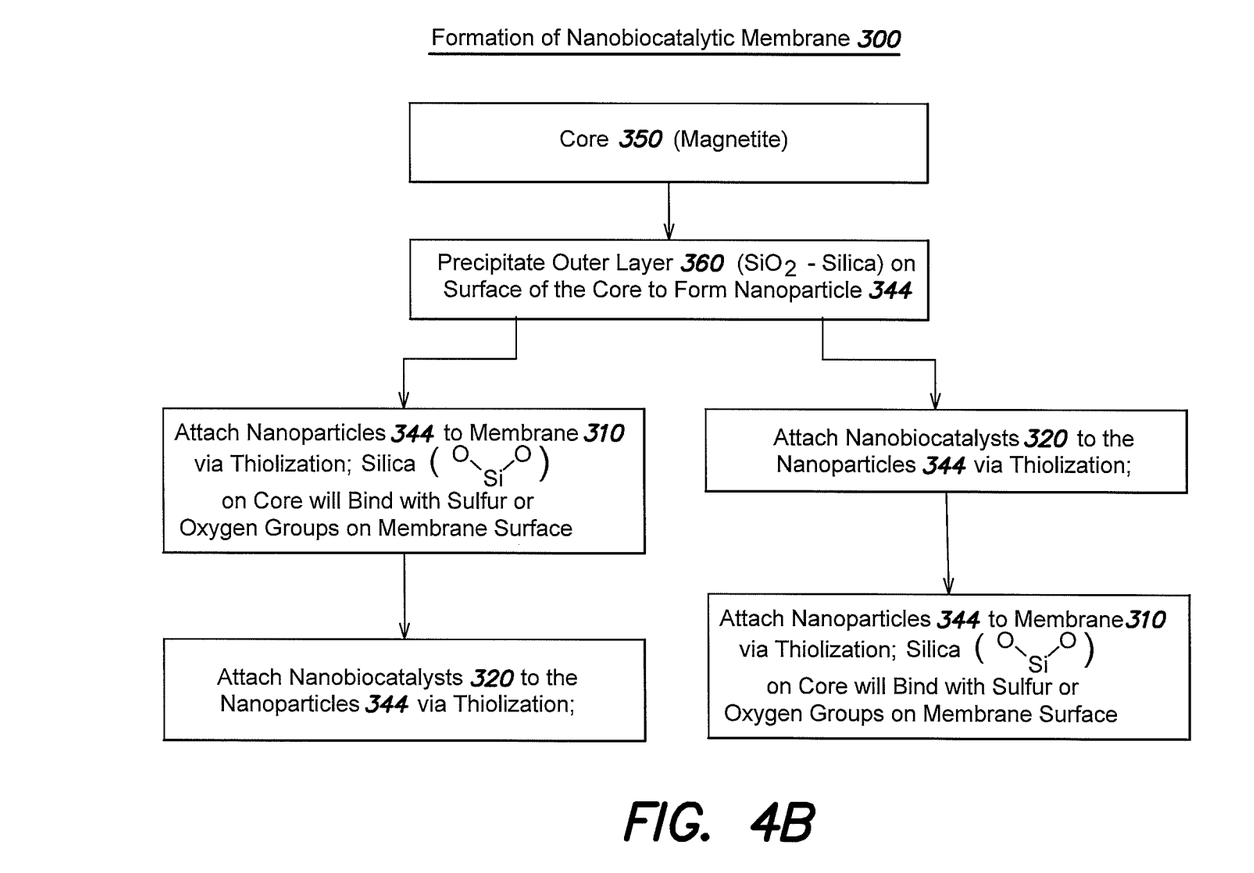

FIGS. 4A and 4B illustrate block diagrams representing a method of forming the above described nanobiocatalytic membrane 300 for a filtration system 100, 200 according to one embodiment. Antibacterial nanoparticles 330 can comprise a particle of less than 1 um in diameter that is toxic to Gram negative bacteria, Gram positive bacteria, or both. In many embodiments it comprises a material that is non-toxic to mammals. It has been found that bismuth, and in particular bismuth thiol particles are effective at bacterial control. One example of forming bismuth-thiol nanoparticles is shown in Eq.1. Bismuth nitrate, $Bi(NO)_3$, and mercaptopropanol are reacted in aqueous or alcoholic solution to form cationic bismuth mercaptopropanol (BisBAL$^+$). As shown in FIG. 4A, to initiate nucleation of the soluble BisBAL$^+$ ions, the solution is irradiated with ultraviolet light (UV-A). The charge neutralized BisBAL molecules nucleate into insoluble nanoparticles. The nanoparticles may have, for example, an average diameter of less than 100 nm, less than 50 nm or less than 25 nm. The resulting nanoparticles are lipophilic, which has been shown to be important for antimicrobial activity.

Eq. 1

BisBAL nanoparticles

Figure 6B:
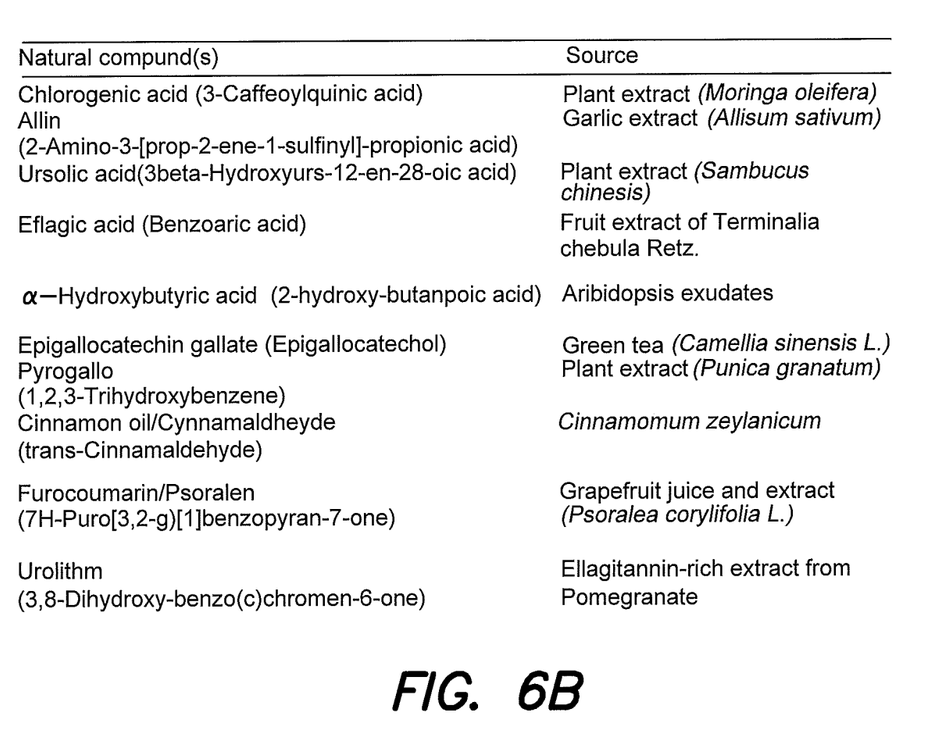

As shown in FIG. 4A, in some embodiments, after the Bi nanoparticles are formed, quorum quenching agents 340 can be associated with the antibacterial nanoparticles 330. An agent is associated with a nanoparticle when it is either chemically bonded or otherwise attached to the nanoparticle so that they migrate as a unitary body. Quorum quenching agents include quorum quenching enzymes that can be immobilized on the antibacterial nanoparticles using, for example, adsorption, covalent binding, entrapment or affinity mobilization. Cross-linking or covalent immobilization can be accomplished using bi or multi functional binding agents such as glutaraldehyde, hisdiazobenzidine and hexamethylene diisocyante. In one embodiment, quorum quenching enzymes in the family of AHL-lactonases and AHL-acylases may be employed. These enzymes are widespread in the bacterial world and have also been found in eukaryotes. The inventors recognize that other quorum quenching enzymes may also be employed as the invention is not limited in this respect. For example, the AHL-lactonase-like nature of PON enzymes can also prevent the AHL signals as cell-to-cell communication, and thus may be utilized as the quorum quenching enzyme in one embodiment. New classes of quenching enzymes such as N-[2-(1H-indol-3-yl)ethyl]-urea(yayurea A) and N-(2-phenethyl)-urea (yayurea B) have also been shown to inhibit cell-to-cell communications and may also be utilized in the present invention. In another embodiment, the quorum quenching enzyme may include oxidoreductase and/or paraoxonase. FIGS. 6A and 6B illustrate a list of other natural compounds and sources which include quorum quenching enzymes (known to quench quorum sensing in microbes) which may be employed in the present invention.

As illustrated in FIG. 4B, the method may include first providing a core 350, which may, for example, be made of an iron based material such as magnetite. Second, one may precipitate a metal oxide such as silica ($SiO_2$) on the core 350 to form the outer layer 360. Outer layer 360 may partially or completely cover core 350 and may be grown to any desired thickness. Outer layer may account for more than 1%, more than 5%, or more than 10% of the diameter of particle 344. In some embodiments, outer layer 360 may have a thickness of, for example, 0-1 nm, 1-5 nm, 1-10 nm or greater. Thereafter, one may introduce nanobiocatalyst nanoparticles 320 and attach the nanoparticles via the mesoporous silica outer layer 360. The nanobiocatalyst nanoparticles may include antibacterial nanoparticles 330 as well as quorum quenching enzymes 340. In some cases, the nanobiocatalyst nanoparticles 320 can be retained in the pores of the mesoporous outer layer 360. In particular, in one illustrative embodiment, the antibacterial nanoparticle 330 component may include bismuth (Bi) and, in particular, a bismuth thiol such as bismuth dimercaptopropanol (BisBAL). The bismuth nanoparticles, such as BisBAL may attach to the silica shell via thiolization where sulfur atoms on the BisBAL bond with available oxygen atoms on the silica layer.

Finally, the nanobiocatalyst nanoparticles 342, including core 350, coating 360, antibacterial nanoparticles 330 and quorum quenching agent 340 can be flowed onto a membrane 310 and can attach to the surface of the membrane via, for example, a thiol linkage with available fluorine sulfur or oxygen atoms on the membrane surface. If it is desirable to limit the decoration of the membrane to specific surfaces, for example pore walls, other areas of the membrane can be blocked by coating with a material that does not have an affinity for sulfur atoms. After attachment of the nanobiocatalyst nanoparticles to the desired areas, the blocking material can be removed, for example, by chemical, photochemical or physical means.

As shown in FIG. 4B, the order of these actions can be altered to suit a particular filter system or manufacturing process. In one embodiment, coated nanoparticle 344 is attached to the membrane 310 after it has been decorated with the antibacterial nanoparticles 330 and quorum quenching enzymes 340. In other embodiments, the coated nanoparticle 344 is associated with the membrane 310 and then decorated in situ with the antibacterial nanoparticles 330 and quorum quenching enzymes 340. In particular, in the absence of a membrane and/or any other surface, one can synthesize the BisBAL nanoparticles (or another type of antibacterial nanoparticle 330) separately using the above described reaction and thereafter attach the nanoparticles 330 to the membrane surface or any other suitable surface that is amenable to surface modification. Furthermore, in the presence of a membrane surface or silica/membrane surfaces, the above described reaction results in the nucleation of the nanoparticles on all exposed surfaces.

One of ordinary skill in the art will appreciate that the order of these steps may be adjusted as the invention is not limited in this respect. Furthermore, it is recognized that the nanobiocatalysts may be added to the membrane during the manufacturing process of the membrane or it may be thereafter applied to the membrane, such as in a coating, after the membrane is manufactured. Nanobiocatalysts may also be formed in situ directly on the membrane surface. Membranes can be stored or shipped with nanoparticles 342 attached to the membrane surface.

In different embodiments, effective quorum quenching enzyme activity can last for more than 7 days, more than 30 days or more than 60 days under conditions of normal use. Thereafter, the nanobiocatalytic membrane may need to be recharged, which can be done in situ or ex situ.

According to another aspect a method of using a nanobiocatalytic membrane in a filtration system is also disclosed. The method includes providing a nanobiocatalytic membrane in a fluid passageway, where the nanobiocatalytic membrane includes at least one nanobiocatalyst nanoparticle coupled to a membrane, where the at least one magnetic nanobiocatalyst includes a core (e.g., magnetic), a plurality of antibacterial nanoparticles, and a plurality of quorum quenching enzymes. The method further includes flowing a fluid through the passageway and through the nanobiocatalytic membrane, and recovering the at least one magnetic nanobiocatalyst with a magnetic device positioned downstream of the membrane. The filtration system may for example be configured for either cross flow filtration or dead end filtration. The magnetic device may be positioned within the passageway. As mentioned above, when the nanobiocatalysts are coupled to a magnetic core, they can be recovered downstream of the membrane with a magnetic device. Then, the recovered nanobiocatalysts can be reloaded onto the membrane and used again to prevent the formation of a biofilm on the membrane.

Figure 5:
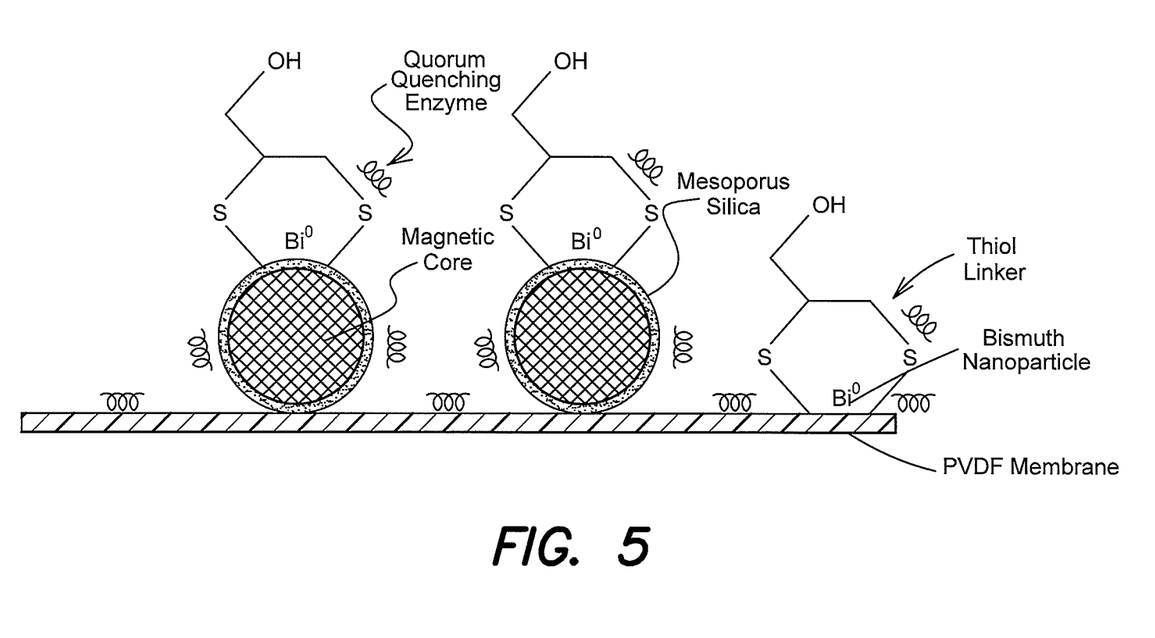
FIG. 5 illustrates a schematic view of the nanobiocatalyst and the nanobiocatalytic membrane according to one embodiment.

Turning now to FIG. 5, a schematic view of the structures associated with the nanobiocatalyst and the nanobiocatalytic membrane according to one embodiment is illustrated. As shown, a plurality of magnetic cores with a mesoporous silica outer layer is associated with the membrane. In one particular embodiment, the membrane is a polyvinylidene difluoride (PVDF) ultrafiltration membrane, but as discussed in greater detail below, in other embodiments, other types of membranes are also contemplated as the invention is not so limited. BisBAL nanoparticles are linked to the silica outer layer of the magnetic nanoparticle via a thiol linkage. As shown, the thiol linkage may also provide a mechanism for bonding the silica outer layer of the nanobiocatalyst nanoparticle to the membrane. The quorum quenching enzyme, such as acylase, may be attached to the bismuth nanoparticle via a binding agent such as glutaraldehyde.

In particular, in one embodiment, antimicrobial lipophilic bismuth dimercaptopropanol nanoparticles (BisBAL NPs) may be used. In one embodiment, the bismuth concentration on the membrane surface may be approximately 0.437 g/m². In one embodiment, the toxic range of $Bi^{+3}$ concentration (minimum inhibitory concentration) for Gram positive and Gram negative bacteria is 15-16 µM. One of the aspects that makes bismuth desirable as an antibacterial agent is that it does not dissolve too quickly in neutral pH water and will last longer than, for instance, silver. Bismuth dissolves faster at lower pH's which can prove advantageous in the low pH micro environment that is produced by bacteria. In one embodiment, the bismuth nanoparticles are roughly spherical and are approximately 20 nm wide. The resulting surface to volume ratio has been found to provide a steady supply of bismuth capable of controlling the growth of bacteria on the membrane. In another embodiment, other antibacterial nanoparticles are also contemplated, such as, but not limited to Zinc Oxide (ZnO), Copper Oxide (CuO), Iron Oxide ($Fe_2O_3$), and Silver (Ag).

As mentioned above, the nanobiocatalyst includes quorum quenching agents, such as enzymes to help disrupt intercellular communication of bacteria, thus, inhibiting communication between bacteria particles on the membrane, and thereby preventing the growth of biofilms. As mentioned above, in one embodiment, the quorum quenching enzymes may be either acylase and/or lactonase. In one embodiment, the range of concentrations for the enzyme is between 0.5-4 mg/mL. To test the efficacy of the quorum quenching enzymes in the nanobiocatalyst nanoparticles, an experiment was conducted utilizing 300 mL of the acylase enzyme solution at a specified concentration of 0.5-4 mg/mL to coat four coupons of PVDF membrane where each membrane had a surface area of 84 cm². In one embodiment, the enzyme concentration on the membrane surface is at least approximately 0.89 ml/cm². In another embodiment, the enzyme concentration on the membrane surface is at least approximately 0.6 ml/cm². In another embodiment, the enzyme concentration on the membrane surface is at least approximately 0.4 ml/cm².

Figure 7:
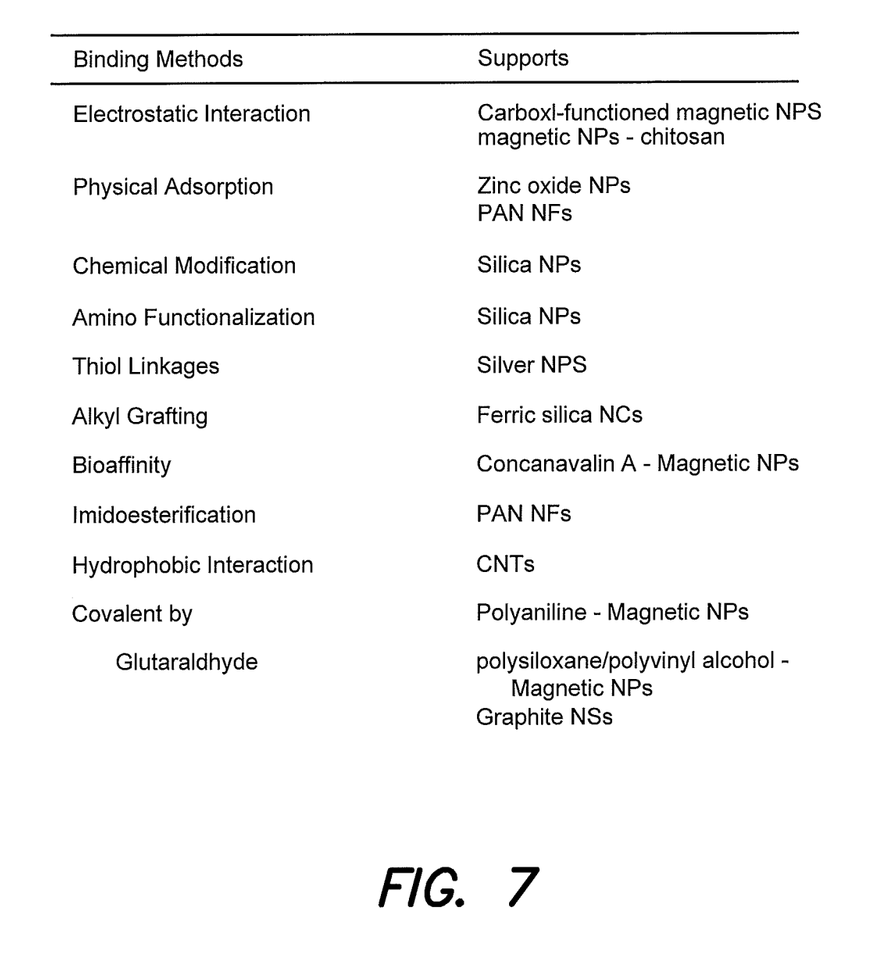
FIG. 7 illustrates a list of binding methods to immobilize the quorum quenching enzyme on the antibacterial nanoparticle.

As also mentioned above, the quorum quenching enzyme may be attached to the antibacterial nanoparticle with a binding agent, and in one embodiment, the binding agent used to attach the quorum quenching enzyme to the antibacterial nanoparticle is glutaraldehyde. In other embodiments, other types of binding agents may be used to attach the quorum quenching agent to the antibacterial nanoparticle. FIG. 7 illustrates a list of binding methods to immobilize the quorum quenching enzyme on the antibacterial nanoparticle which may be employed in the present invention. Other binding agents contemplated by the inventors to attach the quorum quenching enzyme to the antibacterial nanoparticle include any thiols- and amines-functionalized ligands.

As mentioned above, in one embodiment, the magnetic core 350 is made of magnetite ($Fe_3O_4$) and the metal oxide outer layer 360 is made of mesoporous silica ($SiO_2$). Magnetite may be desirable because it is economical and nontoxic. In one embodiment, the average thickness of the silica layer is approximately 10 nm. In other embodiments, the metal oxide layer can have an average thickness of, for example, greater than 1 nm, greater than 5 nm, greater than 10 nm, less than 100 nm, less than 50 nm, less than 20 nm, or less than 10 nm. The size of the magnetic core may vary based upon the specific configuration of the membrane, and it may be desirable for the diameter of the magnetic core to be small enough that when decorated with nanobiocatalysts 320, the decorated particle is smaller than the membrane pore size such that the particle can pass through the membrane pores and be affixed to the walls of the pores. In various embodiments, the average diameter of the magnetic core can be less than 450 nm, less than 200 nm, less than 100 nm, or less than 50 nm. In the same and in different embodiments, the average diameter of the magnetic core can be greater than 10 nm, greater than 20 nm, greater than 50 nm or greater than 100 nm. It should be appreciated that in other embodiments, the magnetic core 350 may be made of other magnetic materials, such as but not limited to nickel and cobalt. Furthermore, in other embodiments, the metal oxide outer layer 360 may be made from materials other than silica, including but not limited to, metal oxides, such as alumina and titanium.

The above described nanobiocatalytic membrane has been tested and results indicate that there is a reduction in biofilm formation in comparison to a control membrane that does not include the nanobiocatalysts. For example, under a lab-scale preliminary test, the BisBAL-QQ nanocatalytic PVDF membrane demonstrated a 30-40% reduction in biofilm formation during an 18 hour filtration of secondary waste water containing *Pseudomonas putida*, compared with a non-coated control PVDF membrane. The leaching of the BisBAL nanoparticles (NP) was minimal (<2% of the coated bismuth), and the catalytic activity of the quorum quenching enzyme (QQ) remained around 95% at the end of the filtration. In another test, this unique nanobiocatalytic coating technology was used on a commercial PVDF membrane and the coating materials include Bismuth dimercaptopropanol (BisBAL) nanoparticles and acylase. This surface-modified membrane demonstrated substantially decreased biofilm accumulation compared with a non-coated membrane (15 times lower after an 18 hour filtration test).

Figure 8:
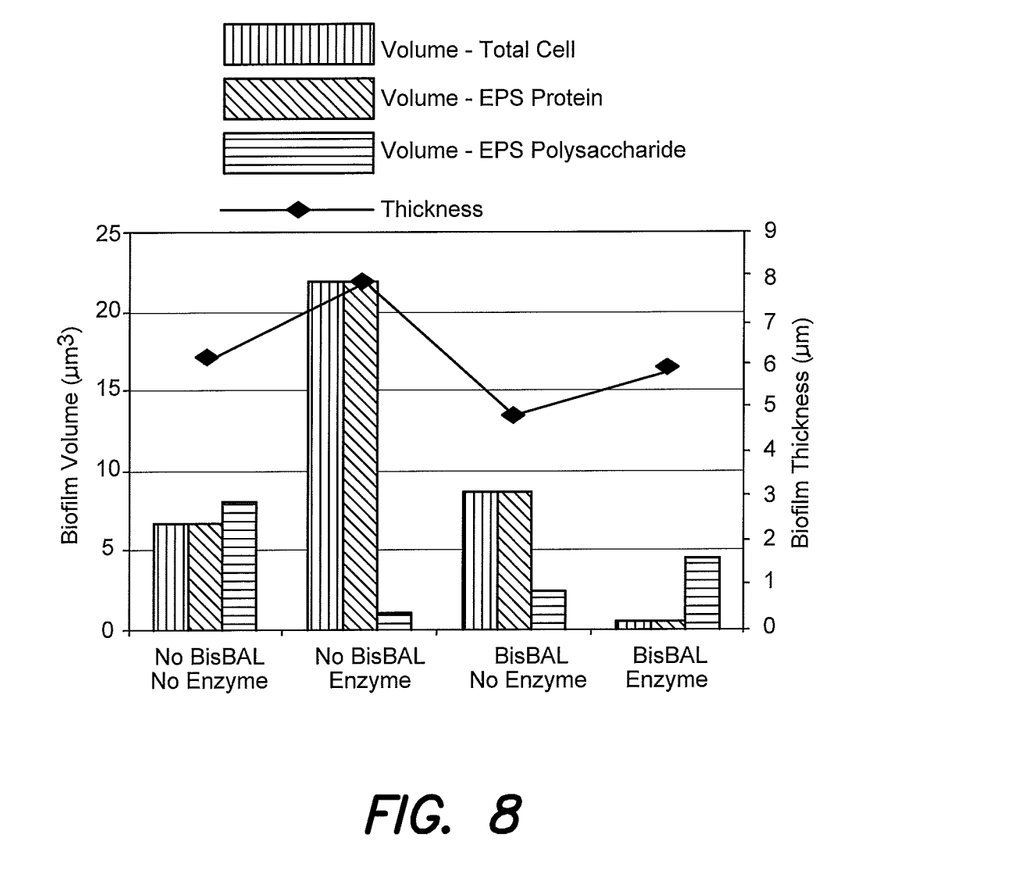
FIG. 8 is a chart which illustrates data for the biofilm volume and biofilm thickness on the membrane for membranes both treated with and without the nanobiocatalyst.

FIG. 8 is a chart which illustrates data for the biofilm volume and biofilm thickness on the membrane for membranes both treated with and without the nanobiocatalysts using confocal laser microscopy analysis (CLMA). In particular, this chart illustrates the CLM analysis showing the biofilm physical and chemical characteristics. PVDF membranes with pure culture *Pseudomonas putida* ($10^8$ cell/mL) were analyzed for various treatments. Quantitative analysis revealed significant reductions in total cell mass (biomass), proteins and polysaccharides in the presence of the nanobiocatalyst treatment described herein. In particular, the far left portion of the chart (labeled No BisBAL, No Enzyme) indicates the control membrane with no nanobiocatalyst coating. For this particular control membrane with no coating, the biofilm total cell (biomass) volume is greater than 6 $\mu m^3$. As shown on the far right portion of the chart, the biofilm total cell (biomass) volume is lower when the membrane is treated with both the antibacterial nanoparticle (BisBAL) and the quorum quenching enzyme. In particular, when the membrane is coated with the above mentioned nanoparticle which includes both the antibacterial nanoparticle and the quorum quenching enzyme, the biofilm total cell (biomass) volume is less than 1 $\mu m^3$. In the condition including quorum-quenching enzyme but no BisBAL, the change in biofilm thickness was statistically insignificant while the biofilm volume decreased by ~33% ($p<0.05$) compared to the control (no coating, no enzyme). In this particular experiment, when compared with the control, in all treatment conditions, the biofilm thickness changed minimally, which may be due to the presence of cell/debris (i.e. in the presence of the enzyme the cells may simply deposit on the membrane surface but the cell-to-cell communication may have been inhibited by the enzyme; in the presence of BisBAL, the cell lysis occurs resulting in the accumulation of cell debris on the membrane surface). Since no membrane backwashing was employed, the cell debris remains on the membrane surface resulting in "no apparent" change in the biofilm thickness. On the contrary, when there is BisBAL alone (coating, no enzyme), or the combination of BisBAL and enzyme, the total cell volume decreased by 87% or 93%, respectively.

Figure 9A:
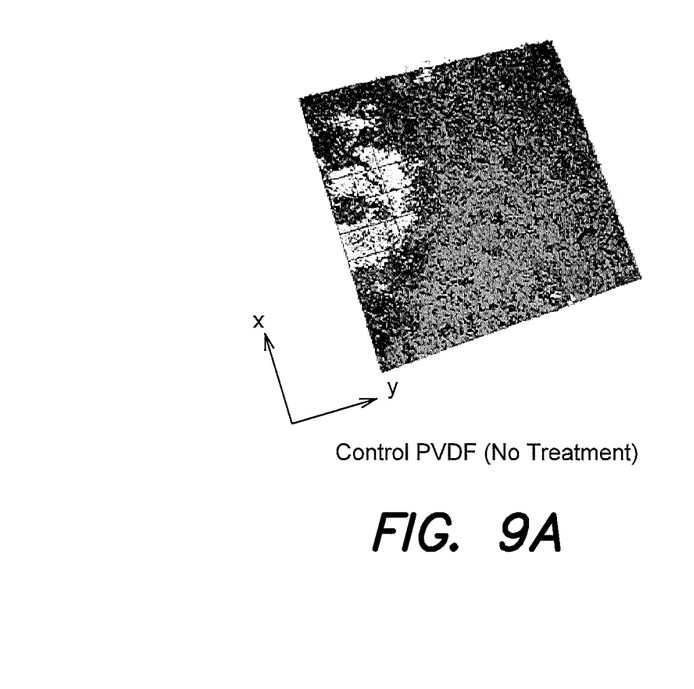
FIG. 9A illustrates confocal laser microscopy analysis (CLMA) of a biofilm on a control membrane with no nanobiocatalyst.
Figure 9B:
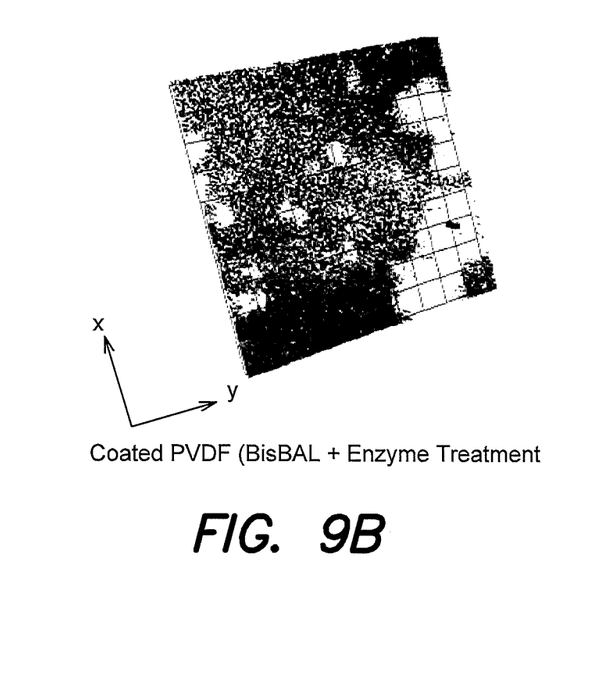
FIG. 9B illustrates confocal laser microscopy analysis (CLMA) of a biofilm on a nanobiocatalytic membrane according to one embodiment.

FIG. 9A illustrates confocal laser microscopy analysis (CLMA) of a biofilm on, a control membrane with no nanobiocatalyst and FIG. 9B illustrates confocal laser microscopy analysis (CLMA) of a biofilm on a nanobiocatalytic membrane made according to one experimental embodiment. In this experiment, a small piece of phosphate buffered saline (PBS) washed membrane was mounted on the glass slide and incubated first with the nucleic acid stain SYTO 9 for 30 min in the dark (2.5 µM, Sigma-Aldrich, St Louis, MO). Subsequently, EPS (Extracellular Polymeric Substances) was tagged separately for polysaccharide (Alexa 633 conjugated Concanavalin A and Wheat Germ Agglutinin, 10 µg/mL each) and protein (1XSypro Orange, 5 µg/mL) for 30 min (Life Technologies, MA). The membrane was rinsed by 1×PBS for three times between nucleic acid and EPS staining to remove additional fluorescent stains. The SlowFade reagent was added onto the biofilm too (Life Technologies, MA). The 3-D images of membrane biofilms were captured with Zeiss LSM 510 Laser Scanning Confocal Microscope with 63× magnification (oil lens). The acquired confocal images were processed by the Velocity software (PerkinElmer, Waltham, MA) to obtain biofilm structural parameters, including biofilm thickness, total cell volume, protein-EPS and polysaccharide-EPS volume. As illustrated, visual observations revealed significant reductions in total cell mass (biomass) in the presence of the claimed nanobiocatalyst treatment.

The size, shape and configuration of the membrane may vary and both crossflow and dead end membranes can benefit from application of the nanopartieles described herein. Membranes may be standard commercially available membranes and may have pore sizes of, for example, 0.45 µm, 0.2 µm or 0.1 µm. Membranes can be configured in different geometries including planar, curved, fluted, hollow and/or spiral wound.

Furthermore, the type of membrane and the membrane material may vary according to different embodiments of the present invention. In one embodiment, the membrane may be a microfiltration membrane which is known for having a pore size between approximately 0.1 to 2.0 µm. In one embodiment, the membrane may be an ultrafiltration membrane which is known for having a pore size between approximately 0.005 to 0.1 µm. In one embodiment, the membrane may be a nanofiltration membrane which is known for having a pore size around approximately 0.001 µm. And in another embodiment, the membrane may be a reverse osmosis membrane retaining dissolved salts and larger molecular weight components. In one particular embodiment, a commercial polyvinylidene difluoride (PVDF) membrane obtained from Millipore (GVWP04700, 0.22 µm) is used. Other membrane materials include, but are not limited to polyolefins, fluorinated polymers including PTFE, nylon, polyethersulfone, polycarbonate, cellulose esters and nitrocellulose. Membranes can be isotropic or anisotropic and include phase inversion membranes, track-etched membranes and hollow fiber membranes.

The foregoing detailed description has been presented for the purposes of illustration and description. It is not intended to be exhaustive or to limit the invention to the particular disclosed embodiments. Numerous variations and configurations will be apparent in light of this disclosure. Thus its intended that the scope of the invention be defined not be this detailed description, but rather by the claims appended hereto.

What is claimed is:

1. A nanobiocatalyst nanoparticle for use with a water purification system, the nanobiocatalyst comprising:
   a core;
   an outer layer substantially surrounding the core;

a plurality of antibacterial nanoparticles coupled to the outer layer, the antibacterial nanoparticles comprising bismuth; and a plurality of quorum quenching enzymes immobilized on at least one of the plurality of antibacterial nanoparticles.

2. The nanobiocatalyst of claim 1, in combination with a membrane, the membrane having a first membrane surface and a second membrane surface opposite the first membrane surface, wherein the nanobiocatalyst is sized and configured to move through the membrane, from the first membrane surface through to the second membrane surface.

3. The nanobiocatalyst of claim 2, in combination with the membrane, wherein the membrane is a porous membrane with a plurality of pores extending therethrough from the first membrane surface to the second membrane surface.

4. The nanobiocatalyst of claim 1, wherein the core is ferromagnetic.

5. The nanobiocatalyst of claim 1, wherein the outer layer is mesoporous silica.

6. The nanobiocatalyst of claim 1, wherein the outer layer is a fumed metal oxide.

7. The nanobiocatalyst of claim 1, wherein the antibacterial nanoparticle comprises a bismuth dithiol.

8. The nanobiocatalyst of claim 7, wherein the antibacterial nanoparticle is lipophilic bismuth dimercaptopropanol.

9. The nanobiocatalyst of claim 1, wherein the quorum quenching enzyme is acylase.

10. The nanobiocatalyst of claim 1, wherein the quorum quenching enzyme is lactonase.

11. The nanobiocatalyst of claim 1, wherein the outer layer that substantially surrounds the core includes a mesoporous silica outer layer.

12. The nanobiocatalyst of claim 11, wherein the plurality of antibacterial nanoparticles are attached to the mesoporous silica outer layer.

13. The nanobiocatalyst of claim 1, wherein the plurality of antibacterial nanoparticles are formed from ions irradiated with ultraviolet light which nucleate into bismuth nanoparticles.

14. The nanobiocatalyst of claim 13, wherein the outer layer that substantially surrounds the core is formed of a silica outer layer.

15. The nanobiocatalyst of claim 14, wherein the plurality of antibacterial nanoparticles are attached to the silica outer layer.

* * * * *